(12) United States Patent
Grama et al.

(10) Patent No.: US 10,088,243 B2
(45) Date of Patent: *Oct. 2, 2018

(54) THERMAL ENERGY BATTERY WITH ENHANCED HEAT EXCHANGE CAPABILITY AND MODULARITY

(71) Applicant: Promethean Power Systems, Inc., Somerville, MA (US)

(72) Inventors: Sorin Grama, Boston, MA (US); Matthew H. Dorson, Arlington, MA (US); Rebecca Christianson, Needham, MA (US)

(73) Assignee: Promethean Power Systems, Inc., Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/419,974

(22) Filed: Jan. 30, 2017

(65) Prior Publication Data

US 2017/0205152 A1    Jul. 20, 2017

Related U.S. Application Data

(63) Continuation of application No. 14/050,167, filed on Oct. 9, 2013, now Pat. No. 9,557,120.

(Continued)

(51) Int. Cl.
*F25D 11/00* (2006.01)
*F28D 20/02* (2006.01)

(52) U.S. Cl.
CPC .................. *F28D 20/021* (2013.01)

(58) Field of Classification Search
CPC ........ F28D 20/021; F28D 20/00; F28D 20/02; F28D 2020/0069; F28D 20/0034;
(Continued)

(56) References Cited

U.S. PATENT DOCUMENTS

| 2,713,251 A | 7/1955 | Cann, Sr. et al. |
| 4,178,727 A | 12/1979 | Prusinski et al. |

(Continued)

FOREIGN PATENT DOCUMENTS

| EP | 1235046 A1 | 8/2002 |
| JP | 2001-336892 | 12/2001 |

(Continued)

*Primary Examiner* — Ana Vazquez
(74) *Attorney, Agent, or Firm* — William A. Loginov; Loginov & Associates

(57) ABSTRACT

This invention provides a thermal energy battery having an insulated tank containing a multitude of densely packed plastic tubes filled with a phase-change material (PCM, such as ice) that changes from solid to liquid and vice-versa. Energy is stored when the PCM transitions from liquid to solid form, and released when the PCM transitions back from solid to liquid form. The tubes are arranged vertically, span the height of a well-insulated tank, and are immersed in heat transfer fluid (HTF) contained within the tank. The HTF is an aqueous solution with a freezing point temperature below the freezing point temperature of the chosen PCM. The HTF remains in liquid form at all times during the operation of the battery. Diffusers located allow the HTF to be extracted uniformly from the tank, pumped and cooled by a liquid chiller situated outside the tank and then and inserted back into the tank.

18 Claims, 7 Drawing Sheets

Related U.S. Application Data

(60) Provisional application No. 61/711,833, filed on Oct. 10, 2012.

(58) Field of Classification Search
CPC ... F28D 20/023; Y02E 60/142; Y02E 60/145; C09K 5/063; A01J 9/04; F25D 31/006
See application file for complete search history.

(56) References Cited

U.S. PATENT DOCUMENTS

| | | |
|---|---|---|
| 4,402,188 A | 9/1983 | Skala |
| 4,403,645 A | 9/1983 | MacCracken |
| 4,524,756 A | 6/1985 | Laverman |
| 4,827,735 A | 5/1989 | Foley |
| 5,072,596 A | 12/1991 | Gilbertson et al. |
| 5,090,207 A | 2/1992 | Gilbertson et al. |
| 5,239,839 A | 8/1993 | James |
| 5,441,097 A * | 8/1995 | Kanda ............... F28D 20/0034 165/10 |
| 6,481,216 B2 | 11/2002 | Simmons et al. |
| 6,493,507 B2 | 12/2002 | Salyer |
| 7,225,860 B2 | 6/2007 | Baginski et al. |
| 7,443,139 B2 | 10/2008 | Mitsui et al. |
| 7,477,038 B2 | 1/2009 | Taniguchi |
| 7,503,185 B2 | 3/2009 | Narayanamurthy et al. |
| 2002/0000306 A1 | 1/2002 | Bradley |
| 2002/0007637 A1 | 1/2002 | Simmons et al. |
| 2006/0070385 A1 | 4/2006 | Narayanamurthy et al. |
| 2008/0209941 A1 | 9/2008 | Narayanamurthy |
| 2008/0315152 A1* | 12/2008 | Daly ..................... C09K 5/10 252/73 |
| 2009/0194257 A1 | 8/2009 | Niu et al. |
| 2011/0226440 A1 | 9/2011 | Bissell et al. |
| 2012/0152511 A1 | 6/2012 | Chang et al. |

FOREIGN PATENT DOCUMENTS

| | | |
|---|---|---|
| JP | 2005-114236 A | 4/2005 |
| KR | 20-2012-0002664 U | 4/2012 |
| WO | 2012169900 A1 | 12/2012 |

\* cited by examiner

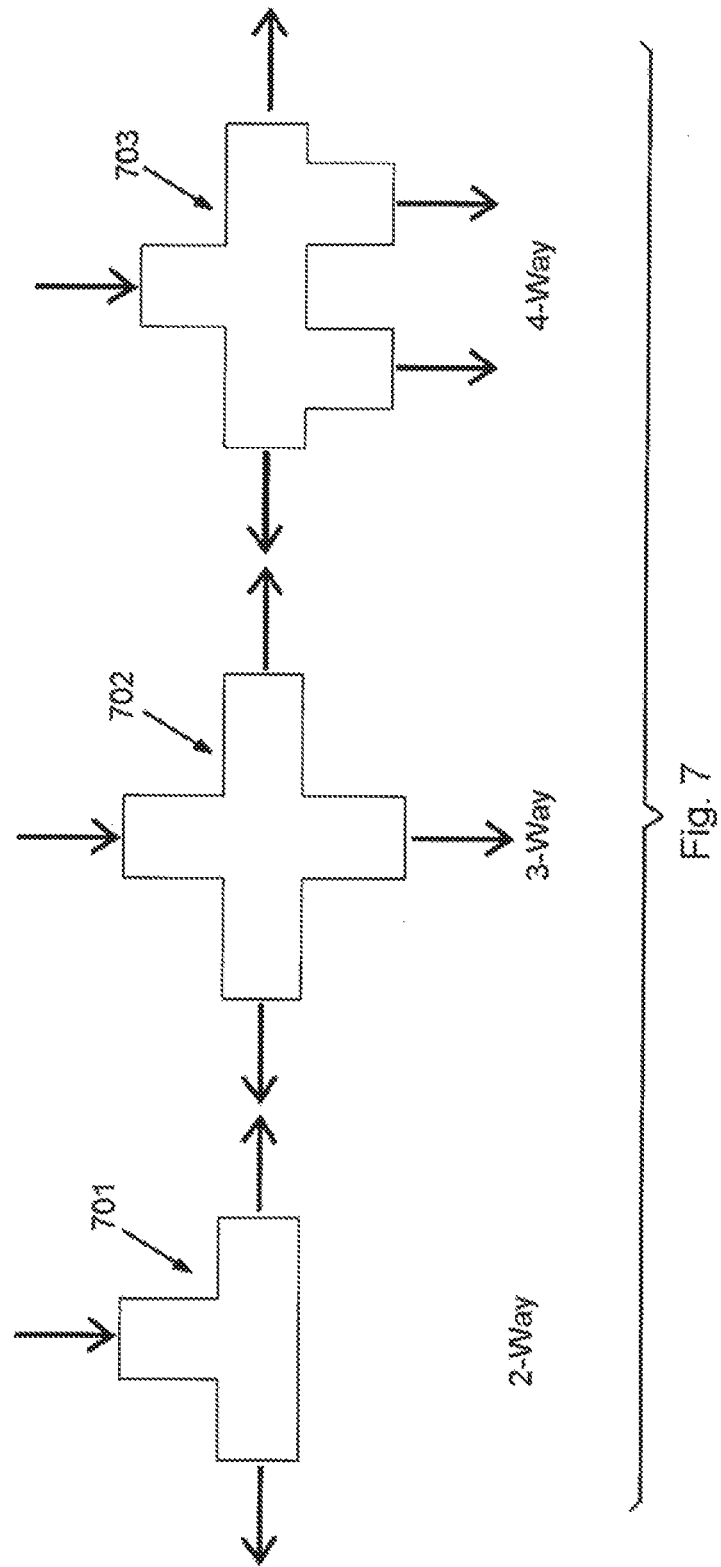

THERMAL ENERGY BATTERY WITH ENHANCED HEAT EXCHANGE CAPABILITY AND MODULARITY

RELATED APPLICATION

This application is a continuation of co-pending U.S. patent application Ser. No. 14/050,167, filed Oct. 9, 2013, entitled THERMAL ENERGY BATTERY WITH ENHANCED HEAT EXCHANGE CAPABILITY AND MODULARITY, which application claims the benefit of U.S. Provisional Application Ser. No. 61/711,833, filed Oct. 10, 2012, entitled THERMAL ENERGY BATTERY WITH ENHANCED HEAT EXCHANGE CAPABILITY AND MODULARITY, by Sorin Grama, et al, the teachings of each of which applications is expressly incorporated herein by reference.

FEDERALLY SPONSORED RESEARCH OR DEVELOPMENT

This invention was made with United States Government support under Grant #1113206 awarded by the National Science Foundation. The U.S. Government has certain rights in this invention.

FIELD OF INVENTION

The present invention relates to thermal energy storage systems, and more particularly to a phase-change energy storage system for refrigeration and air conditioning applications.

BACKGROUND OF THE INVENTION

During a 24-hour period, the electrical grid experiences a large variation in demand. Electrical power consumption peaks during the day and dips significantly at night. Energy storage is often employed to mitigate and smooth out these large fluctuations in power demand. There are many ways of storing energy including electrical, chemical, thermal and mechanical means. Of these, thermal energy is an effective method to store energy in the form of heat or cold for use in heating, refrigeration and air conditioning applications. Considering the fact that a majority of the peak demand is generated by power-hungry heating and refrigeration appliances, thermal energy storage stands to become a leading contender in grid storage applications.

In countries such as India, thermal energy storage can also be used to mitigate the unreliable grid. By way of example, in many rural areas of India grid electricity is only available for a limited time during the day or night. In these situations, a thermal energy storage system can be charged when the grid is on and discharged when the grid is off to provide constant power for critical applications.

One such application is a village-based milk chiller incorporating a thermal energy storage system. The chiller can be operated in remote villages, requires only 5-6 hours of grid electricity to charge and, most significantly, does not require a regular backup diesel (or other) generator. Once charged, the system can quickly cool large amounts of raw milk to preserve its freshness and eliminate spoilage. In these situations, thermal energy storage is not only used to increase energy efficiency, but is essential to mitigate the unreliable grid supply while avoiding the use of expensive and polluting fossil fuels.

Thermal energy storage systems are typically designed for specific applications and are exactly matched for those applications. An example of a cold thermal energy storage system is an ice-bank tank which is typically designed for and fully integrated into an end-user application such as milk chilling. The prior art includes many examples of ice-based milk cooling systems dating back as far as the 1950s, such as U.S. Pat. No. 2,713,251. In this disclosure, the ice-based energy storage system is built into and is an integral part of the milk cooling tank, therefore cannot be easily separated and used for other refrigeration applications. Another example of a monolithic thermal energy storage system for cooling applications is the ice-on-coil storage system used in commercial HVAC applications such as disclosed by Gilbertson et al. in U.S. Pat. No. 5,090,207. The storage system described by Gilbertson et al. is a large monolithic system that requires custom designs and significant civil engineering effort to adapt to other applications.

To increase adoption of thermal energy storage and facilitate ease-of-use, it is desirable that the thermal energy storage be designed as a modular and compact component that can be added to (or subtracted from) any cooling or heating application according to the expected load on the system. Furthermore, thermal energy storage systems can be provided with well-defined specifications such that designers or users can incorporate them easily into their cooling or heating applications. An analogy to this is the electrical battery storage system. Designers can easily connect one or more electrical batteries in series or parallel to build a battery bank for a wide range of applications, from simple off-grid lighting systems to complex electrical vehicle storage systems and large solar power storage systems. This wide variety of electrical storage applications is facilitated by the modularity, compactness and well-defined specifications of the common electrical battery, such as the car battery.

Likewise, it is desirable to provide thermal energy storage systems that are generally as flexible, and as easy to build, as electrical storage systems. To achieve this, it is desirable to provide a compact and modular thermal energy battery with appropriate features to store and release thermal energy at a constant temperature and at a constant rate of discharge. These two specifications (temperature and rate of discharge) can become part of a standard set of specifications of a thermal energy battery which can be adopted by any manufacturer of such batteries.

U.S. Pat. No. 7,225,860 discloses a compact heat battery comprising of a cylinder containing encapsulating tubes filled with a phase-changing material (PCM) that absorbs and releases thermal energy. This battery uses maximally-packed PCM tubes to provide sufficient surface area to achieve a desired discharge rate. Disadvantageously, no provision is made for maintaining a constant discharge rate, other than having sufficient surface area for heat transfer. This is a common and well known method described in prior art, but it makes the battery less compact than it can otherwise be. Furthermore, by relying only on surface area for heat transfer, the battery will not be able to maintain a constant output during discharge because the heat exchange surface area becomes smaller as the PCM begins to melt.

U.S. Pat. No. 4,403,645 describes a high performance thermal storage apparatus which stores and releases its energy more efficiently using one long spiral tube rather than a plurality of PCM-filled encapsulants. However, the system is not modular, is difficult to build and cannot be easily sized for other applications. In another attempt at increasing performance, U.S. Pat. No. 7,503,185 describes a method for enhancing heat exchanging capability using ice-based thermal storage system. However this is a very expensive method of forming ice on copper tube coils.

Various methods of making thermal energy systems more modular are found in prior art, such as U.S. Pat. Nos. 5,239,839 and 4,827,735 which describe methods of encapsulating the PCM into expandable plastic tubes or quilts that can be modularly arranged and therefore used to build compact batteries of any size. These devices suffer from the same limitation as they can not maintain a constant output and discharge rate for long periods of time.

U.S. Pat. No. 4,524,756 describes a thermal energy storage system using modular batteries. This system does not use phase-change materials and thus cannot be very compact. Furthermore, the system described in this disclosure is limited to heat storage and cannot be easily adapted to refrigeration and air conditioning applications. A modular approach suited to refrigeration applications is described in US Patent 2002/0007637, but this method is expensive and relies on fixed path-ways that can only be changed manually using expensive quick-disconnects.

It would be desirable to provide a system that combines the dual demands of compactness and modularity to build efficient thermal energy storage banks that can be easily adapted to a variety of heating and cooling applications.

SUMMARY OF THE INVENTION

This invention overcomes the disadvantages of the prior art by combining the compactness and modularity of encapsulated phase-change materials with the benefits and simplicity of gravity as a motive force to increase heat exchange capability and provide a more constant rate of discharge.

In an illustrative embodiment, an insulated tank contains a plurality of densely packed plastic tubes filled with a phase-change material that changes from solid to liquid and vice-versa. An example of usable PCM is water and ice. Energy is stored when the PCM transitions from liquid to solid form and is released when the PCM transitions back from solid to liquid form. Since PCMs will expand during freezing, the tubes must allow for this expansion to occur without bursting. Therefore, at the top of each tube a portion of air is left such that the PCM can expand during freezing and not spill outside the tube.

The tubes are arranged vertically and span most of the height of the tank. In an embodiment, the tubes are sealed and submersed in a heat transfer fluid (HTF) contained within the walls of the well-insulated tank. Other embodiments allow for the tubes to be open at the top and only partially immersed in HTF such that the HTF and PCM do not mix. The HTF is an aqueous solution with a freezing point temperature below the freezing point temperature of the chosen PCM. The HTF remains in liquid form at all times during the operation of the battery.

One or more diffusers located at the top of the tank allow the HTF to be extracted uniformly from the top of the tank, pumped and cooled by a liquid chiller situated outside the tank and then and inserted back into the bottom of the tank. As the HTF medium cools below the freezing point of the PCM, ice begins to form inside and at the bottom of the PCM-filled tubes. As the HTF surrounding the PCM-filled tubes continues to cool, the PCM inside the tubes begins to freeze progressively from bottom to top. In this manner, ice inside the tubes progressively builds from bottom to top until the PCM-filled tubes are completely frozen. This is defined as the "constant charge cycle." Freezing the tubes from bottom to top is desirable to enable ice to grow progressively upwards while filling the expansion air pocket at the top thereby minimizing the chance of tube bursting if the tube is hermetically sealed.

A second set of diffusers, one located at the bottom of the tank and one located approximately at the top of the tank, allows the HTF to be extracted and returned gently into the tank for the purpose of transferring the latent energy stored in the PCM to a load located outside the tank. Cold HTF is extracted from the bottom of the tank, circulated through a load heat exchanger located outside the tank and returned hot at the top of the tank. It is desirable that the cold HTF at the bottom of the tank does not mix with the hot HTF returning at the top of the tank. This is achieved by tightly packing the PCM-filled tubes in the battery such that the hot HTF at the top exchanges heat with the ice-filled tubes first and does not mix with the cold HTF at the bottom.

As the top of the tank experiences the highest temperature differential between PCM and HTF, ice inside the tubes melts quickly and the stored thermal energy in the PCM is transferred to the HTF. As the PCM inside the tubes begins to melt, the solid form of PCM (i.e. the ice) floats freely to the top of the tubes while the liquid form settles at the bottom of the tubes. Ice floats up to the top because its specific gravity is lower than the liquid form of PCM. As ice floats up it always makes thermal contact with the hottest HTF returning from the load. In this manner, ice progressively melts from bottom to top at a constant and fast rate. This is called the "constant discharge cycle."

Discharge and charge cycles can be run simultaneously or independently, and the output of the thermal energy battery, basically a cold stream of fluid, remains at constant temperature for the longest possible time. The constant temperature output profile and the consequent constant rate of discharge output profile can be defined as a key specification of the thermal energy battery. Because the thermal performance of the thermal energy battery is predictable, multiple batteries can be connected together to form thermal energy storage bank with a well-defined thermal energy transfer characteristic. Multiple batteries can be connected in parallel or in series to build a thermal energy storage bank which can be adapted to any heating or cooling application. Although the current embodiment was designed for a cooling application, the same device can be used for heating applications by simply changing the phase-change material inside the tubes. If the PCM solidifies at a higher temperature, it stores and releases energy at that temperature.

A compact thermal electric battery is comprised of a tank having insulated walls and containing heat transfer fluid (HTF), a plurality or tubes being substantially filled with a phase change material (PCM) and diffusers operatively connected to the tank constructed and arranged to enable flow of the HTF through a chiller and a heat exchanger. The PCM contains a mixture of water and a nucleating agent, which can include at one least one of Borax and/or IceMax® powder in solution or another equivalent compound or combination of compounds. The PCM can include a freezing point depression agent. The freezing point suppressant can include MKP, NaCl, KCl or other salts, among other equivalent compounds or combinations of compounds. The tubes are arranged vertically between a bottom and a top of the tank and float relative to the gravity in the tube. The tubes include an open space when the PCM is in a liquid phase for expansion of the PCM from liquid to solid. The diffusers are located so that a diffuser in which the HTF enters the tank is located at the top of the tank and a diffuser in which the HTF exits the tank is located on a bottom of the tank. A temperature sensor is located at the bottom of the battery where it can provide an accurate indication of the battery state of charge. An estimate of the battery state of charge can be made by analyzing a single temperature trend. At least one entry diffuser located remote from the bottom at a distance that causes entering HTF to be substantially free of thermal interference with the coldest HTF. The HTF comprises a mixture of water and Isopropyl alcohol having a concentration adapted to a predetermined freezing point. A multiple thermal battery system is comprised of a plurality of thermal batteries constructed and arranged to interconnect in parallel or series to increase storage capacity, wherein each of the batteries includes connectors constructed and arranged to enable addition or subtraction of batteries to match the predetermined storage capacity. Each battery is provided with a diffuser connected to another diffuser using an interconnection system. A method for controlling the freeze melt cycle of a thermal battery providing vertically oriented tubes containing PCM; and initiating a freeze cycle from the bottom of each of the tubes towards the top and/or initiating a melt cycle from the top of each of the tube toward the bottom. The method for controlling the freeze melt cycle further comprising a display of a state of charge and for obtaining the state of charge from a single sensor. The storage capacity can vary by selectively connecting and disconnecting a plurality of batteries together via an interconnection system.

BRIEF DESCRIPTION OF THE DRAWINGS

The invention description below refers to the accompanying drawings, of which:

FIG. 7 is a diagram of interconnections used to connect multiple batteries such as those shown in FIG. 6.

DETAILED DESCRIPTION

According to an illustrative embodiment, a compact and modular thermal energy storage (TES) battery is shown and described herein. Also shown and described are systems and methods for charging and discharging the illustrative battery and systems and methods for connecting multiple batteries to form a thermal energy storage bank.

Figure 1:
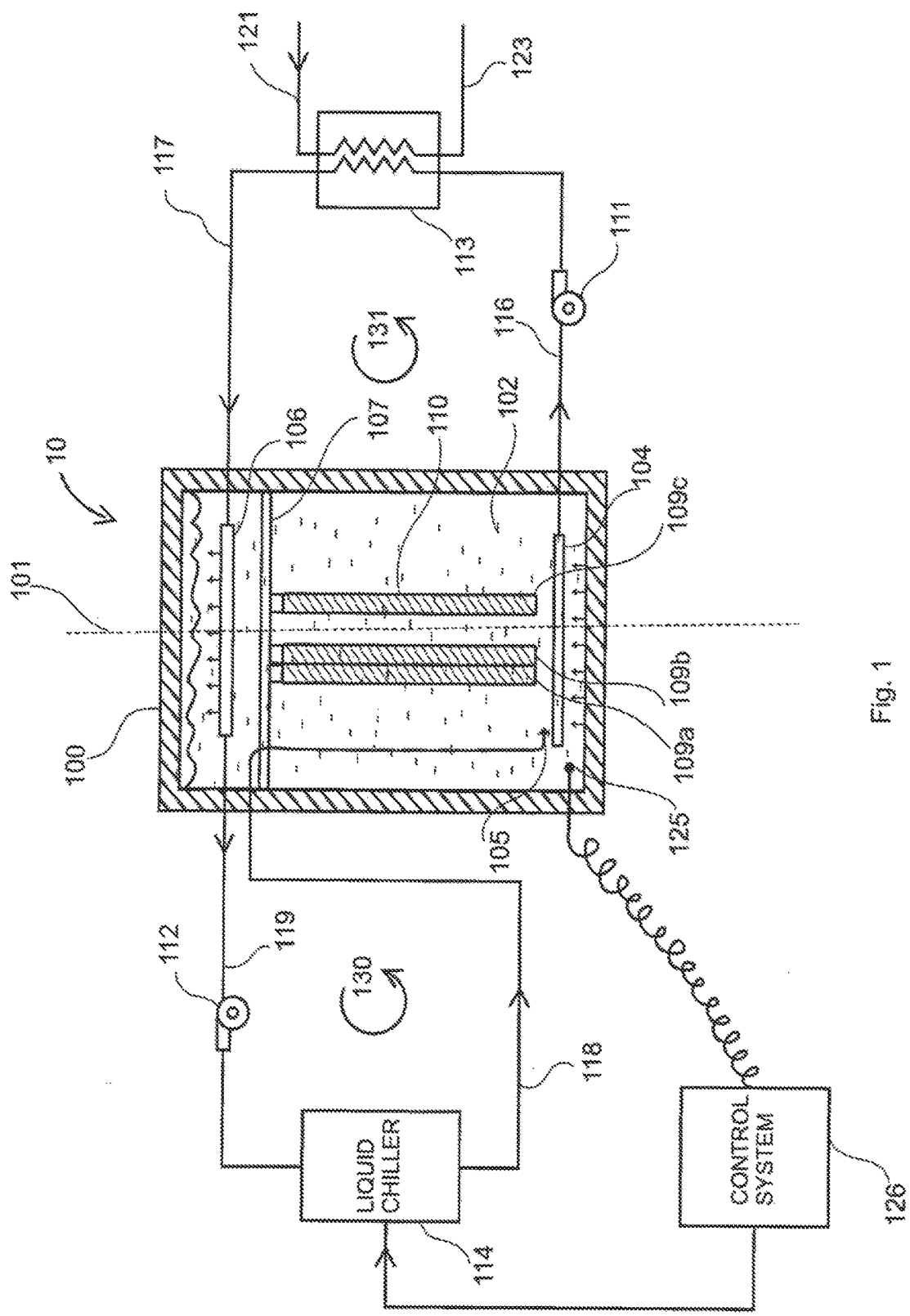
FIG. 1 is a block diagram showing all major components of a complete system including one thermal energy battery, shown in side cross section, connected in a charge and discharge loop.

A thermal energy battery 10 and all associated components to charge and discharge the battery are shown in FIG. 1. The TES battery 10 comprises of an insulated container 100 oriented vertically about axis 101. Container 100 is filled with heat transfer fluid (HTF) 102. In an illustrative embodiment, HTF 102 is a mixture of water and 30% isopropyl alcohol, the freezing point of which is −15 degrees C. (5 degrees F.). The mixture is based on a predetermined freezing point. Other HTF mixtures can also be used, such as water and propylene glycol (PPG), in proper proportion to ensure a depressed freezing point below the freezing point of the chosen phase-change material (PCM).

In various embodiments, the PCM can compromise a mixture of water with additives that reduce the super-cooling effect of water. One such additive is the commercially available SnoMax® snow inducer, available from York International Corporation of Norwood, Mass. Another PCM can be a mixture of water and Mono-Potassium Phosphate ($KH_2PO_4$ also abbreviated as MKP) with an appropriate nucleating agent such as SnoMax® to reduce super-cooling effects or IceMax®. IceMax® powder is an ice machine cleaner containing sulfamic acid and is manufactured by Highside Chemicals, Inc. of Gulfport, Miss. Another PCM can be a mixture of water and Borax. In an embodiment we mix Mono-Potassium Phosphate (MKP) with water in concentrations of 12% to 14% which is near the eutectic point of the mixture to ensure direct transition from liquid to solid and vice-versa without partial solid-liquid formation. The freezing point of this MKP mixture ranges from −3 to −6 degrees C. (21.2 to 26.6 degrees F.) and the latent heat of fusion this MKP mixture is approximately 290 kJ/kg. The MKP mixture is ideal for food refrigeration applications where the target cooling temperature of the food is approximately 3 to 5 degrees C. (37.4 to 41 degrees F.). Because the MKP mixture melts at approximately −2 degrees C. (28.4 degrees F.) it provides a sufficient temperature differential (relative to the food's target temperature) to make the load heat exchangers more efficient. At the same time, because the lowest temperature for freezing this mixture is approximately −6 degrees C. (21.2 degrees F.), the refrigeration system required to freeze the mixture can be operated at temperatures that ensure high coefficient of performance and therefore good energy efficiency. The latent heat of fusion of the MKP mixture is high compared with other PCM mixtures generally used in the industry. Finally, MKP is a non-toxic, affordable and easily obtainable material.

Inside container 100, and immersed in HTF 102, are placed in a plurality of tubes 109 filled with the PCM 110. In an illustrative embodiment, the tubes hermetically sealed and completely submersed in HTF 102 and are held together vertically by closely packing them inside insulated container 100. As the tubes float upwards, a restricting mesh 107 is used to keep tubes 109 submersed in HTF 102 at all times. Two diffusers, 106 at the top and 104 at the bottom, are located horizontally inside container 100 to extract and return HTF 102 for achieving heat transfer with outside mediums. In an illustrative embodiment, diffusers are circular tubes with a plurality of holes to diffuse flow for the purpose of achieving a gentle discharge or a uniform suction.

Bottom diffuser 104 is connected via cold suction pipe 116 to pump 111 which circulates cold HTF 102 through load heat exchanger 113. After exchanging heat with the load, hot HTF 102 returns via pipe 117 and through diffuser 106 back to the top of the battery 10.

In an embodiment, diffuser 106 is shared between the hot discharge and hot suction. Diffuser 106 is connected via suction pipe 119 to pump 112 which circulates warm HTF 102 through liquid chiller 114. After it is cooled by liquid chiller 114, cold HTF 102 returns through pipe 118 via diffuser 105 into battery 10. In the illustrative embodiment diffuser 105 is located at the bottom of the container 100 to initiate freezing cycle from the bottom of battery 10.

Liquid chiller is defined as a type of heat exchanger that removes heat from the liquid as it passes from the inlet to the outlet thereof. This can include fluid mechanical systems, thermoelectrics, etc.

Other locations for diffuser 105 are also acceptable. Diffuser 105 can also be located at the top if a freezing direction from top to bottom is desired. Diffusers 104, 105 and 106 are submerged at all times in HTF 102. Diffusers 104, 105, and 106 are arranged such that the HTF 102 being extracted or returned through diffusers does not mix significantly in a vertical direction.

In FIG. 1, two methods of operation are shown. Charge loop 130 is a closed loop which cools HTF 102 and charges battery 10 by freezing PCM 110 inside tubes 109. Because coldest HTF is returned near the bottom of battery 10, ice insides tubes 109 begins to form near the bottom first. Tubes 109 progressively freeze upwards as cold HTF 102 rises from the bottom of battery 10. When PCM 110 inside all tubes 109 is completely frozen, battery 10 can be considered fully charged. To achieve a fully charged status, charge loop 130 must be operated for a minimum amount of time, depending on the cooling power of the liquid chiller 114. If loop 130 is operated for less than the minimum time, battery 10 can be partially charged without loss of operational capability.

Discharge loop 131 is a closed loop which circulates coldest HTF 102 from the bottom of battery 10 so it can transfer energy with a load. In the illustrative embodiment the load is warm milk entering heat exchanger 113 via port 121 and exiting cold via port 123. After transferring heat with the load, hot HTF 102 exits load heat exchanger 113 and returns to top of battery 10 via diffuser 106. If battery 10 is fully or partially charged, PCM 110 in solid form (ice) will be present at the top of tubes 109. Warm HTF 102 will transfer heat with frozen PCM 110 through the walls of tubes 109. As a result PCM 110 melts. As PCM 110 melts the liquid form settles at the bottom of tube 109 while the solid form floats freely to the top due to gravity. In this manner, PCM 110 in solid form is continually present at the top in constant thermal contact with warm HTF 102 returning from the load. As PCM 110 melts it transfers energy to HTF 102 which cools and settles to the bottom of battery 10. In this manner the coldest HTF 102 is available at the bottom of battery 10 for the longest period of time, depending on the quantity of PCM in the battery. Discharge loop 131 can be operated for as long as solid PCM 110 remains in tubes 109. When all PCM in tubes 109 are melted, battery 10 can be considered fully discharged. If, after running discharge loop 131 for some time, some PCM in solid forms still remains inside tubes 109, battery 10 can be considered partially discharged without loss of operational capability. Successive operations of loop 131 will progressively discharge battery 10 until battery is fully discharged.

Charge loop 130 and discharge loop 131 can be operated simultaneously or independently. If operated simultaneously, output of discharge loop 131 will not be disturbed by the performance of charge loop 130. Charge loop 130 can be operated manually or automatically based on a timer or a temperature sensor 125 placed inside the battery. In the illustrative embodiment a temperature controller 126 starts and stops discharge loop 130 based on a pre-set temperature. Independent of charge loop 130, discharge loop 131 can be manually or automatically operated as long as battery 10 is partially or fully charged. In the illustrative embodiment, loop 131 is operated manually when needed to cool milk.

The battery is defined by all and/or at least one of a plurality of parameters. A first parameter is that the battery is provided with a capacity at a determined load power. A second parameter is that the battery is provided with a capacity of a determined number of hours at a desired load power. A third parameter is that the depth of discharge is at least a desired percentage rate. A fourth parameter is that the battery is provided with at least a desired number of rated cycles. A fifth parameter is that the battery is provided with a desired output temperature. Other parameters can also be defined in determining standard sizes by one of ordinary skill. These differences can be used to determine standardized rating size. Such rating sizes can be defined in a manner similar to commercial consumer batteries (for example, A, AA, AAA, C and D). The nomenclature of the sizes is highly variable. For example, the nomenclature can be numeric (1, 2, 3, etc.), alphabetic (A, B, C, etc.), symbolic or by another system.

Figure 2:
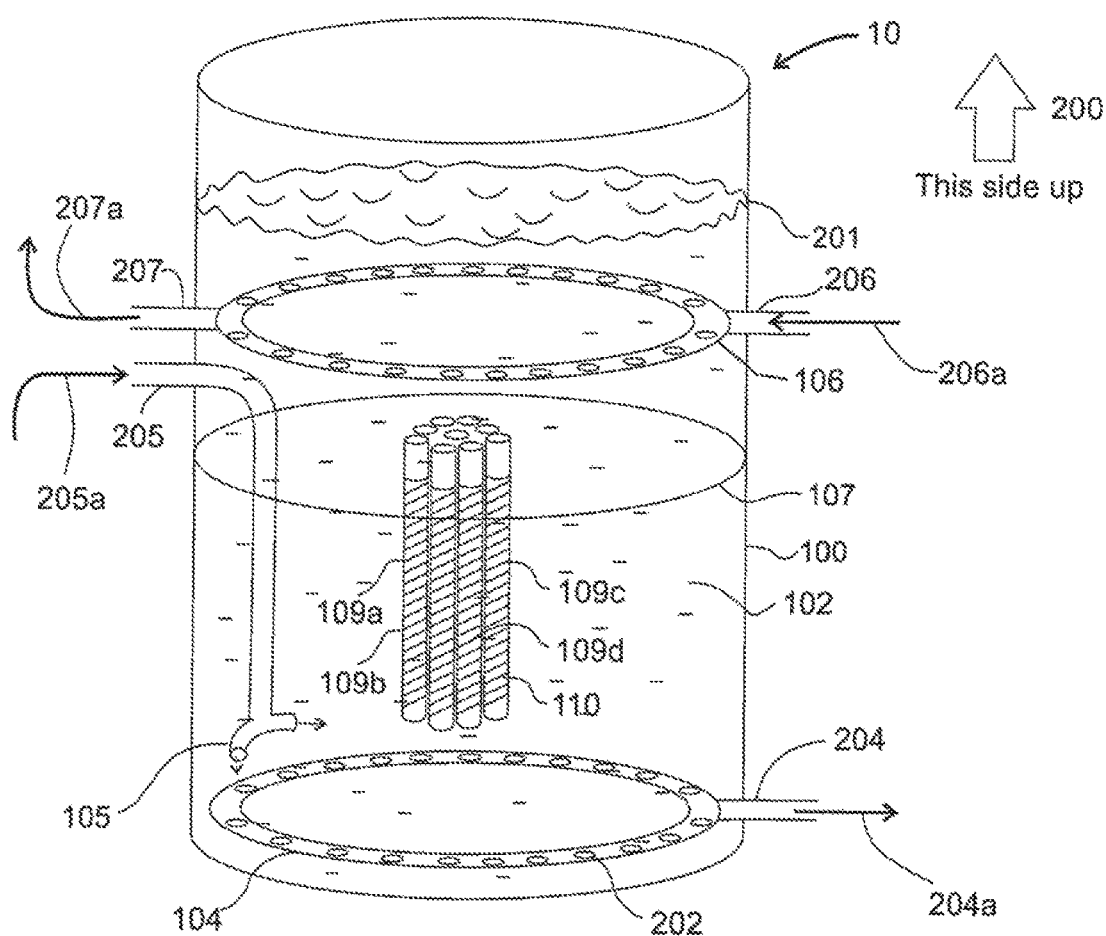
FIG. 2 is a more detailed exposed perspective view of the inside of the illustrative battery of FIG. 1.

A more detailed view of the present construction of battery 10 is shown in FIG. 2. In the illustrative embodiment, insulated container 100 is a plastic (polymer, composite, etc.) tank that is generally free of any chemical reaction with HTF 102. Tubes 109 are sealed and submersed in heat transfer fluid (HTF) 102 and held in vertical position by the restricting mesh 107. HTF 102 extends to level 201. In another embodiment, tubes 109 can float freely in HTF 102 and are not restricted by mesh 107. General orientation 200 is desirably maintained to ensure free floating of ice to the top of tubes 109.

Diffusers 104 and 106 are illustratively formed by bending a plastic (polymer) tube into a circular shape and drilling (or otherwise forming) a multiplicity of holes 202 that server to diffuse the flow during operation. In an embodiment, holes 202 in diffuser 104 point downwards while holes 202 in diffuser 106 point upwards. Holes 202 can also be oriented radially from the vertical axis to minimize vertical mixing of HTF 102 layers.

To facilitate connection to charge loop 130, input port 205 and output port 207 are provided. Port 205 is connected to diffuser 105 and port 207 is connected to diffuser 106. To facilitate connection to discharge loop 131, input port 206 and output port 204 are provided. Port 206 is connected to diffuser 106 and port 204 is connected to diffuser 104. It should be clear to those of skill in the art that ports 204, 205, 206 and 207 can be located at any height to facilitate easy connection with elements outside the battery so long as diffusers 104, 105 and 106 are maintained at the approximate locations shown in FIG. 2

Figure 3:
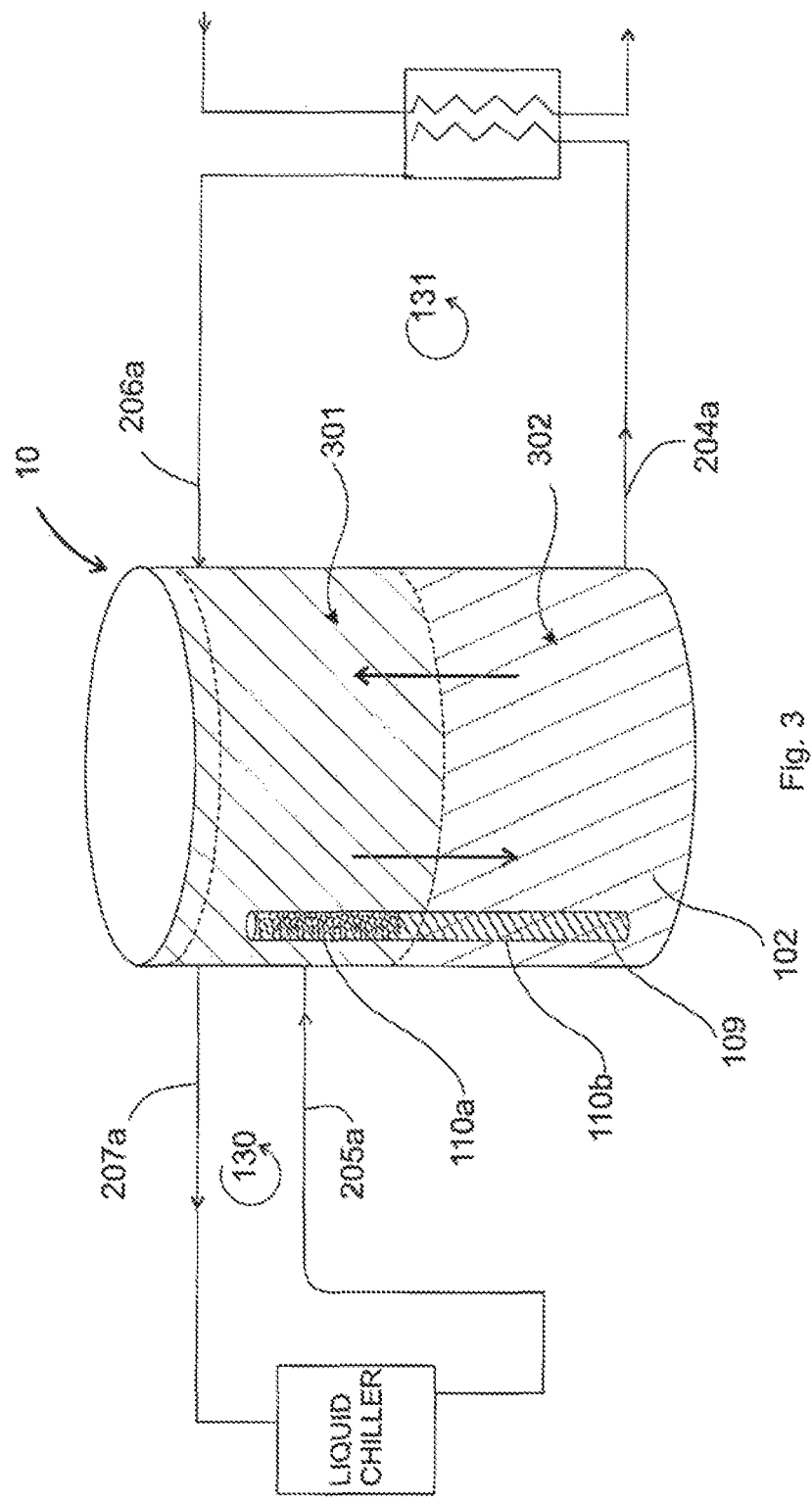
FIG. 3 is a schematic diagram showing the theory of operation of the system of FIG. 1.

FIG. 3 illustrates the different processes occurring inside the battery. The solid form (ice) 110a of PCM 110 in tubes 109 rises at the top because it is less dense than the liquid form 110b of PCM 110. As hot HTF 102 is returned to the top and cold HTF 102 settles at the bottom, two regions are formed inside battery 10. These regions are further maintained by the vertical arrangement and the connections to discharge loop 131 and charge loop 130. Regions 301 and 302 are critical to maintaining optimal heat transfer and output from battery 10. Region 301 located approximately at the top of the battery, is where most of the heat exchanging between hot HTF 102 and the solid form 110a of PCM 110 occurs. Region 302 is where the coldest HTF 102 will be maintained and extracted at nearly constant temperature for the longest period of time.

Figure 4:
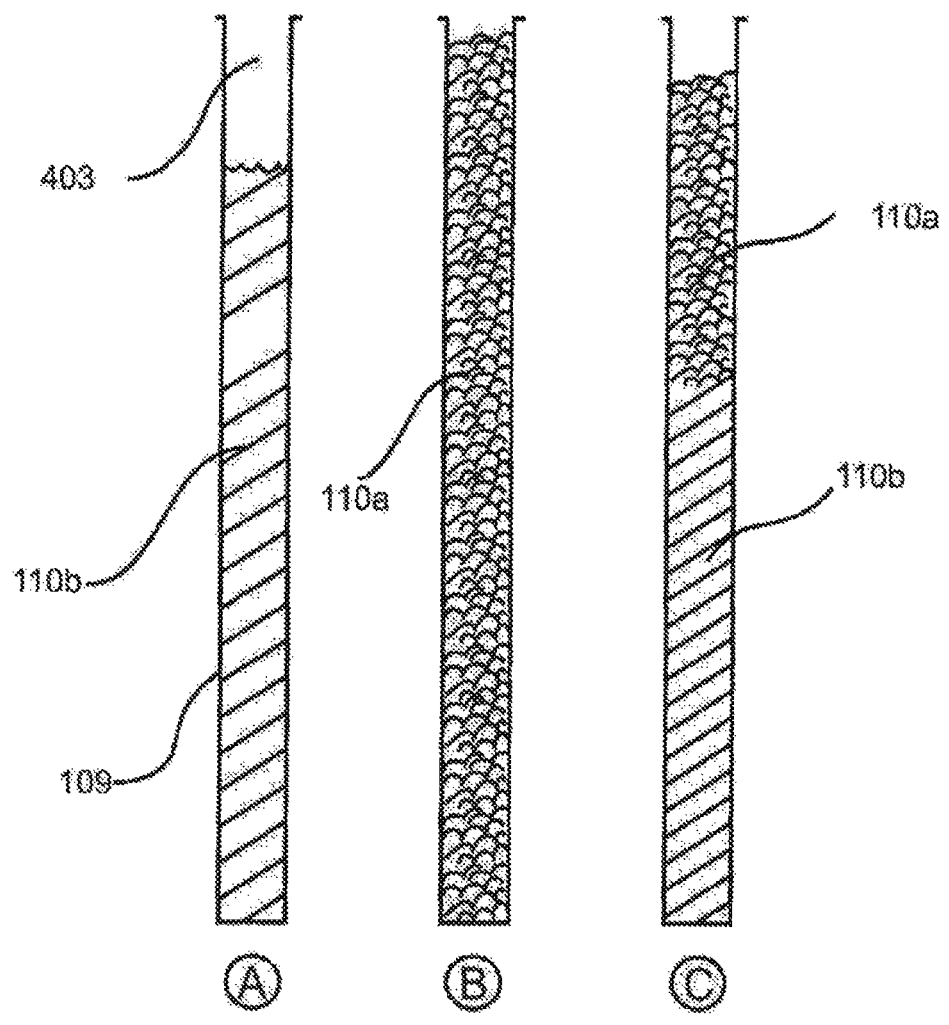
FIG. 4 is a view of the PCM-filled tubes within the illustrative battery of FIG. 1, shown in different operating states.

FIG. 4 further illustrates the PCM-filled tubes 109 and their operational state. Tube 109 can be constructed of plastic or any other material that facilitates optimal heat transfer. Tube 109 can be hermetically sealed or not sealed. Item a of FIG. 4 illustrates a tube filled with PCM 110 in liquid form 110b. This is the discharged state of the tube 109.

A small amount of empty space 403 remains at the top of the tube 109 to provide room for expansion of PCM liquid 110b as it transitions from liquid to solid form. It is desirable that tube 109 is free of significant expansion during freezing process. Instead, PCM material will expand into empty space 403 at the top. Item B of FIG. 4 illustrates a tube in fully charged state with PCM 110 in solid state 110a. PCM 110 in solid form 110a extends to the top of the tube. Item C of FIG. 4 illustrates a tube in partially charged state with PCM 110 in both solid 110a form at the top and liquid 110b form at the bottom.

Figure 5:
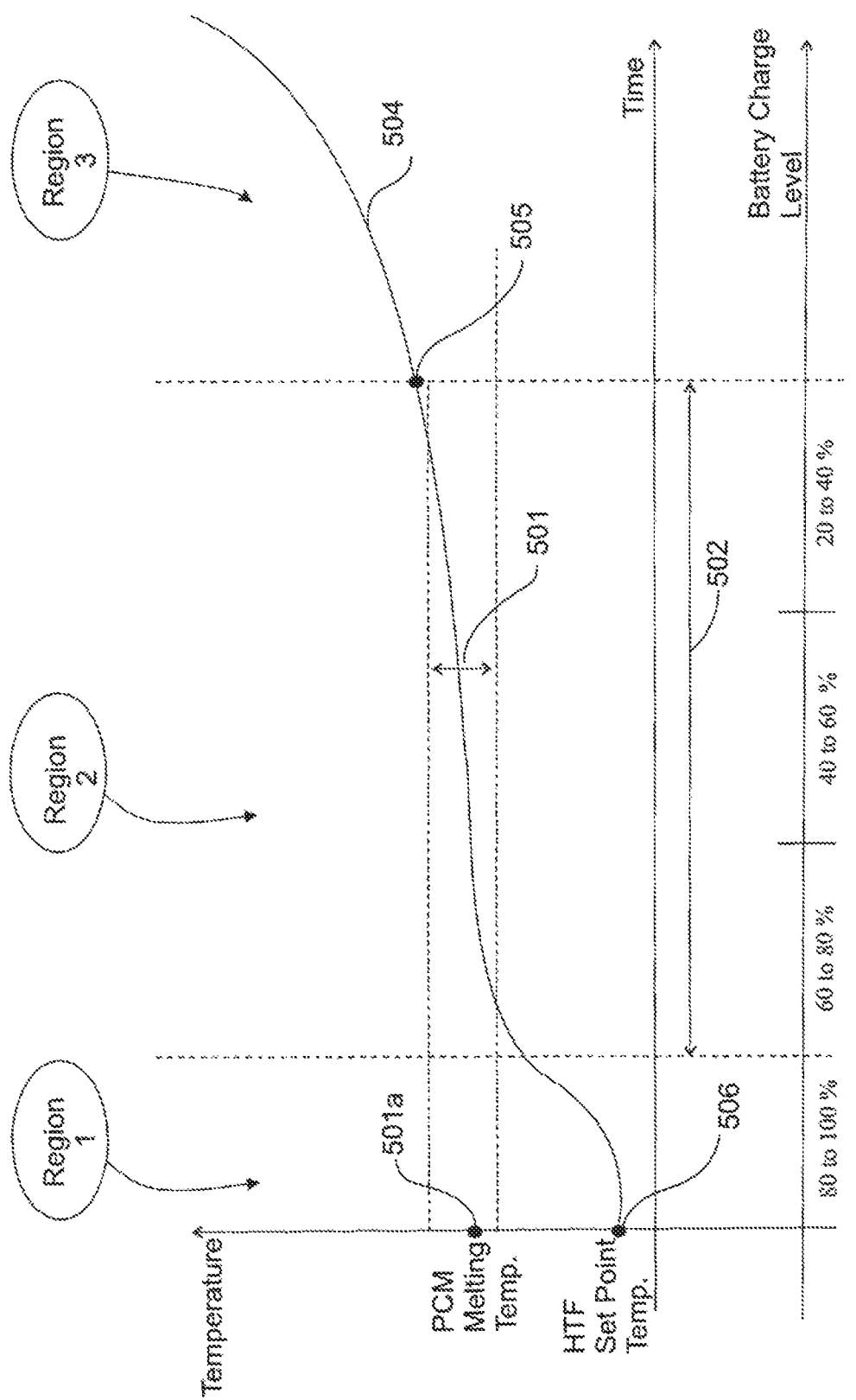
FIG. 5 is a graph of the expected output of the illustrative battery of FIG. 1.

FIG. 5 shows the expected output of the battery when the above construction is implemented as illustrated by curve 504. The useful output of battery 10 is defined by two parameters:
 a) the temperature of HTF 102 extracted at the bottom through diffuser 104 and measured by temperature sensor 125; and
 b) the duration of time at which a relatively constant output temperature can be maintained.

A desired constant temperature output level can be centered within a narrow range 501 centered around PCM 110 melting point 501a. Temperature bandwidth 501 can be maintained for a period of time 502 which depends on the load presented to the battery by the load heat exchanger. It is desirable to provide a temperature output bandwidth 501 as narrow as possible for the longest period of time 502 as possible. Three regions of operation are observed. In Region 1, the output power of battery 10 is mainly provided by the sensible heat of HTF 102. The time duration of this region depends on the amount of HTF in the battery. Once PCM 110 in tubes 109 begins to melt, the battery enters Region 2 of operation. This is the main and optimal region of operation during which output HTF 102 temperature remains relatively constant within a narrow bandwidth 501 centered about melting point 501a. When all PCM 110 has melted, the battery enters Region 3. In this region, the battery has exhausted its charge and less useful energy is delivered to the load. From starting point 506 to end point 505, the battery provides a useful output for fast cooling or heating a large variety of loads.

Placing the temperature sensor 125 at the bottom of the battery and monitoring its change over time gives an accurate indication of the state of charge of the battery. As the battery transitions from starting point 506 to end point 505, its state of charge can be easily estimated by analyzing the temperature trend.

This predictive performance and accurate display of the state of charge is essential in designing thermal battery banks and systems that use thermal battery backup.

Figure 6:
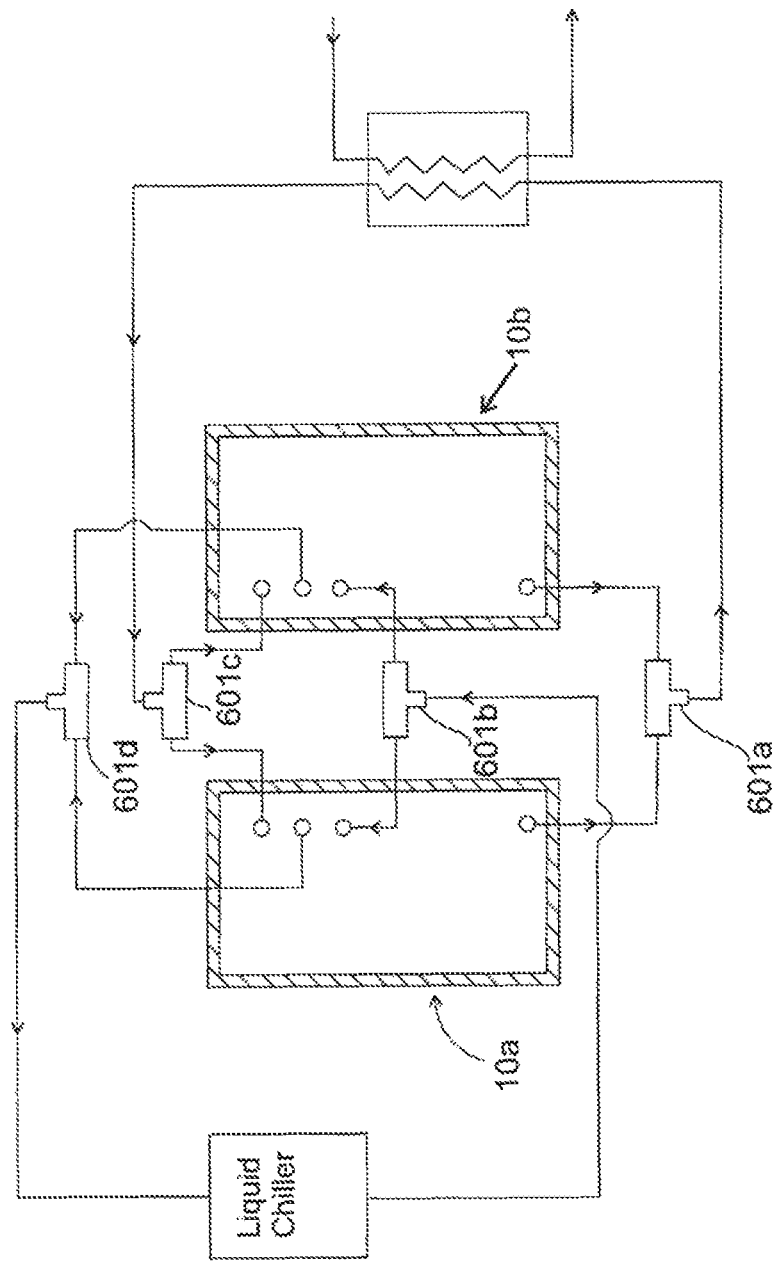
FIG. 6 is a block diagram showing how two batteries in accordance with embodiments herein can be operatively connected in parallel to provide a thermal battery bank.

FIG. 6 shows a block diagram of an arrangement of multiple batteries 10 connected together to form a thermal energy battery bank that can be sized according to any specified heat or cooling load. In an embodiment, two batteries 10a and 10b are connected in parallel using manifolds 601a, 601b, 601c and 601d (collectively, "Manifolds 601"). Manifolds 601 eliminate the need for expensive valves. When two batteries 10 are connected in parallel, HTF 102 is extracted simultaneously from both batteries. Manifolds 601 act as junctions that merge the HTF flows to and from the load or the liquid chiller. Such a construction can be susceptible to an imbalance of flows in the two batteries. For example, if there is small restriction in one of the lines exiting or entering one of the batteries in the bank, less HTF will flow through that battery and more HTF will flow through the other battery. Over a period of time, one battery will empty out while the other will overflow potentially resulting in HTF spilling out of battery 10. However, in the illustrative arrangement, the flow between batteries in the bank is balanced naturally by the way the batteries are connected. Manifolds 601 and especially manifold 601a contains a sufficiently large cross section to ensure that the HTF 102 in both batteries remains substantially balanced at the operating flow rates. In addition, all manifolds are submerged in HTF. Thus, the liquid pressure remains constant throughout the two batteries. It is contemplated that a multiple thermal battery system comprises a plurality of thermal batteries constructed and arranged to interconnect in a parallel or series to increase storage capacity, wherein each of the batteries includes connectors constructed and arranged to enable addition and/or subtraction of batteries to match a predetermined storage capacity.

Manifolds 601 can be sized according to the number of batteries that can be connected to form a battery bank. FIG. 7 shows for comparison a 2-way manifold 701, a 3-way manifold 702 and a 4-way manifold 703. Those skilled in the art can recognize and find other ways to connect multiple batteries together such as series connection or using multiple manual or automatically actuated valves.

It is contemplated that the materials of the tubes can be a polymer, such as LDPE (low-density polyethylene) or HDPE (high-density polyethylene). The tank can be constructed of LDPE. It is contemplated that the volume of the tank is 700 liters (approximately between 500 to 1000 liters). The illustrative thermal battery storage system is practical for use in small installations, easy to load and unload and can be assembled by a couple of technicians.

The foregoing has been a detailed description of illustrative embodiments of the invention. Various modifications and additions can be made without departing from the spirit and scope if this invention. More generally, as used herein the directional terms, such as, but not limited to, "up" and "down", "upward" and "downward", "rearward" and "forward", "top" and "bottom", "inside" and "outer", "front" and "back", "inner" and "outer", "interior" and "exterior", "downward" and "upward", "horizontal" and "vertical" should be taken as relative conventions only, rather than absolute indications of orientation or direction with respect to a direction of the force of gravity. Each of the various embodiments described above can be combined with other described embodiments in order to provide a variety of combinations of multiple features. Furthermore, while the foregoing describes a number of separate embodiments of the apparatus and method of the present invention, what has been described herein is merely illustrative of the application of the principles of the present invention. It is further contemplated that diffusers 104, 105 and 106 can be constructed in any manner that slows down the flow to minimize mixing between different vertical layers of HTF 102. In other embodiments diffuser 105 can be located near the top, the middle or the bottom of battery 10 depending on the cooling power of liquid chiller 114 and/or how the battery is operated. Alternatively, diffuser 106 can be eliminated completely and the hot HTF 102 can be released without turbulence at the top of the battery where it circulates and mixes freely with only the top layer of HTF above tubes 109. In another embodiment, insulated container 100 can be of any size, shape or aspect ratio as long as tubes 109 containing PCM 110 remain oriented in a vertical direction. In further embodiments, HTF 102 can consist of any liquid mixture that is free of freeze-over within the operating temperature range of the battery. The output temperature of the battery can vary, depending on the PCM used. It is further contemplated that the tubes can be of any shape, size and profile as long as the tubes avoid constriction of the free flow of ice to the area of the tube where maximum heat transfer with HTF will occur.

Accordingly, this description is meant to be taken only by way of example, and not to otherwise limit the scope of this invention.

What is claimed is:

1. A battery assembly for storing thermal energy, comprising:
    a tank having insulated walls and containing heat transfer fluid (HTF);
    a plurality of vertically floating cylindrical tubes floating along a vertical axis within the tank, each of the plurality of cylindrical tubes defining a height along the vertical axis, each of the tubes being substantially filled with a phase change material (PCM);
    a first diffuser disposed in an upper portion of the tank and being operatively connected to a first outlet port that provides warm HTF to a first heat exchanger configured to cool the warm HTF;
    a second diffuser disposed in a lower portion of the tank and being operatively connected to outlet second port that provides cold HTF to a second heat exchanger configured to cool a liquid;
    an inlet port operatively connected to the first diffuser such that warm HTF returning from the second heat exchanger is provided to the upper portion of the tank such that the warm HTF at the upper portion of the tank does not mix with the cold HTF at the lower portion of the tank; and
    a temperature sensor that senses a temperature which is indicative of amount of PCM that has changed phase located in the battery where it can provide an indication of the battery state of charge.

2. The battery for storing thermal energy as set forth in claim 1 wherein the PCM includes a mixture of water and a nucleating agent.

3. The battery for storing thermal energy as set forth in claim 2 wherein the nucleating agent comprises IceMax® powder in solution.

4. The battery for storing thermal energy as set forth in claim 3 wherein the plurality of tubes include an open space when the PCM is in a liquid phase for expansion of the PCM from liquid to solid.

5. The battery for storing thermal energy as set forth in claim 1 wherein the PCM further includes an agent that adjusts a freezing point to a predetermined level.

6. The battery for storing thermal energy as set in claim 5 wherein a freezing point suppressant includes salts.

7. The battery for storing thermal energy as set for in claim 6 wherein the salt is at least one of MKP, NaCl, and KCl.

8. The battery for storing thermal energy as set forth in claim 1 wherein the plurality of tubes are kept submersed in the HTF at all times by a restricting mesh.

9. The battery for storing thermal energy as set forth in claim 1 wherein the HTF is comprised of a mixture of water and isopropyl alcohol having a concentration adapted to a predetermined freezing point.

10. The battery for storing thermal energy as set forth in claim 1, wherein each of the tubes includes an empty space therein that allows for expansion of the PCM, the empty space having a circular cross section that is perpendicular to the vertical axis.

11. A battery assembly for storing thermal energy, comprising:
    a tank having insulated walls and containing heat transfer fluid (HTF);
    a plurality of vertically floating cylindrical tubes floating along a vertical axis within the tank, each of the plurality of cylindrical tubes defining a height along the vertical axis, each of the tubes being substantially filled with a phase change material (PCM);
    a first diffuser disposed in an upper portion of the tank and being operatively connected to a first outlet port that provides warm HTF to a first heat exchanger configured to cool the warm HTF;
    a second diffuser disposed in a lower portion of the tank and being operatively connected to outlet second port that provides cold HTF to a second heat exchanger configured to cool a liquid;
    a temperature sensor that senses a temperature which is indicative of amount of PCM that has changed phase located in the battery where it can provide an indication of the battery state of charge;
    a second tank, connected in parallel to the tank, having insulated walls and containing second heat transfer fluid (HTF);
    a second plurality of vertically floating cylindrical tubes floating along a second vertical axis within the second tank, each of the second plurality of cylindrical tubes defining a second height along the second vertical axis, each of the second plurality of cylindrical tubes being substantially filled with a second phase change material (PCM);
    a third diffuser disposed in an upper portion of the second tank and being operatively connected to a third outlet port that provides warm HTF to a third heat exchanger configured to cool the warm HTF;
    a fourth diffuser disposed in a lower portion of the second tank and being operatively connected to a fourth outlet port that provides cold HTF to a fourth heat exchanger configured to cool a liquid.

12. A method for cooling a heat transfer fluid (HTF), comprising:
    passing, via a first inlet port, warm HTF to a first diffuser in an upper portion of a tank filled with a plurality of vertically-oriented cylindrical tubes containing phase change material (PCM) in a solid form and PCM in a liquid form, with the solid PCM floating atop the liquid PCM, each of the plurality of cylindrical tubes defining a height along a vertical axis of the tank, the vertical axis passing through the upper portion and a lower portion of the tank;
    passing, via a first outlet port, warm HTF from the first diffuser to a first heat exchanger configured to cool the warm HTF;
    passing, via a second inlet port, cold HTF to the lower portion of the tank in proximity to a second diffuser;
    passing, via a second outlet port, cold HTF to a second heat exchanger configured to cool a liquid.

13. The method of claim 12, wherein the PCM is an aqueous-based solution.

14. The method of claim 12, further comprising connecting a plurality of thermal batteries in parallel.

15. The method of claim 12, wherein the PCM includes a mixture of water and a nucleating agent.

16. The method of claim 15, wherein the nucleating agent comprises IceMax® powder in solution.

17. A battery assembly for storing thermal energy, comprising:

a first thermal battery, comprising:
- a tank having insulated walls and containing first heat transfer fluid (HTF);
- a plurality of vertically floating cylindrical tubes floating along a vertical axis within the tank, each of the plurality of cylindrical tubes defining a height along the vertical axis, each of the tubes being substantially filled with a phase change material (PCM);
- a first diffuser disposed in an upper portion of the tank and being operatively connected to a first outlet port that provides warm HTF to a first heat exchanger configured to cool the warm HTF;
- a second diffuser disposed in a lower portion of the tank and being operatively connected to outlet second port that provides cold HTF to a second heat exchanger configured to cool a liquid; and
- a temperature sensor that senses a temperature which is indicative of amount of PCM that has changed phase located in the battery where it can provide an indication of the battery state of charge;

a second thermal battery, connected in parallel to the first thermal battery, comprising:
- a second tank having insulated walls and containing second heat transfer fluid (HTF);
- a second plurality of vertically floating cylindrical tubes floating along a second vertical axis within the second tank, each of the second plurality of cylindrical tubes defining a second height along the second vertical axis, each of the second plurality of tubes being substantially filled with a second phase change material (PCM);
- a third diffuser disposed in an upper portion of the second tank and being operatively connected to a third outlet port that provides warm second HTF to a third heat exchanger configured to cool the warm second HTF;
- a fourth diffuser disposed in a lower portion of the second tank and being operatively connected to a fourth outlet port that provides cold second HTF to a fourth heat exchanger configured to cool the liquid.

18. The battery assembly of claim 17, further comprising at least one manifold having a predetermined cross section such that the first HTF and the second HTF is balanced among the first and second battery.

* * * * *